Patented Feb. 3, 1953

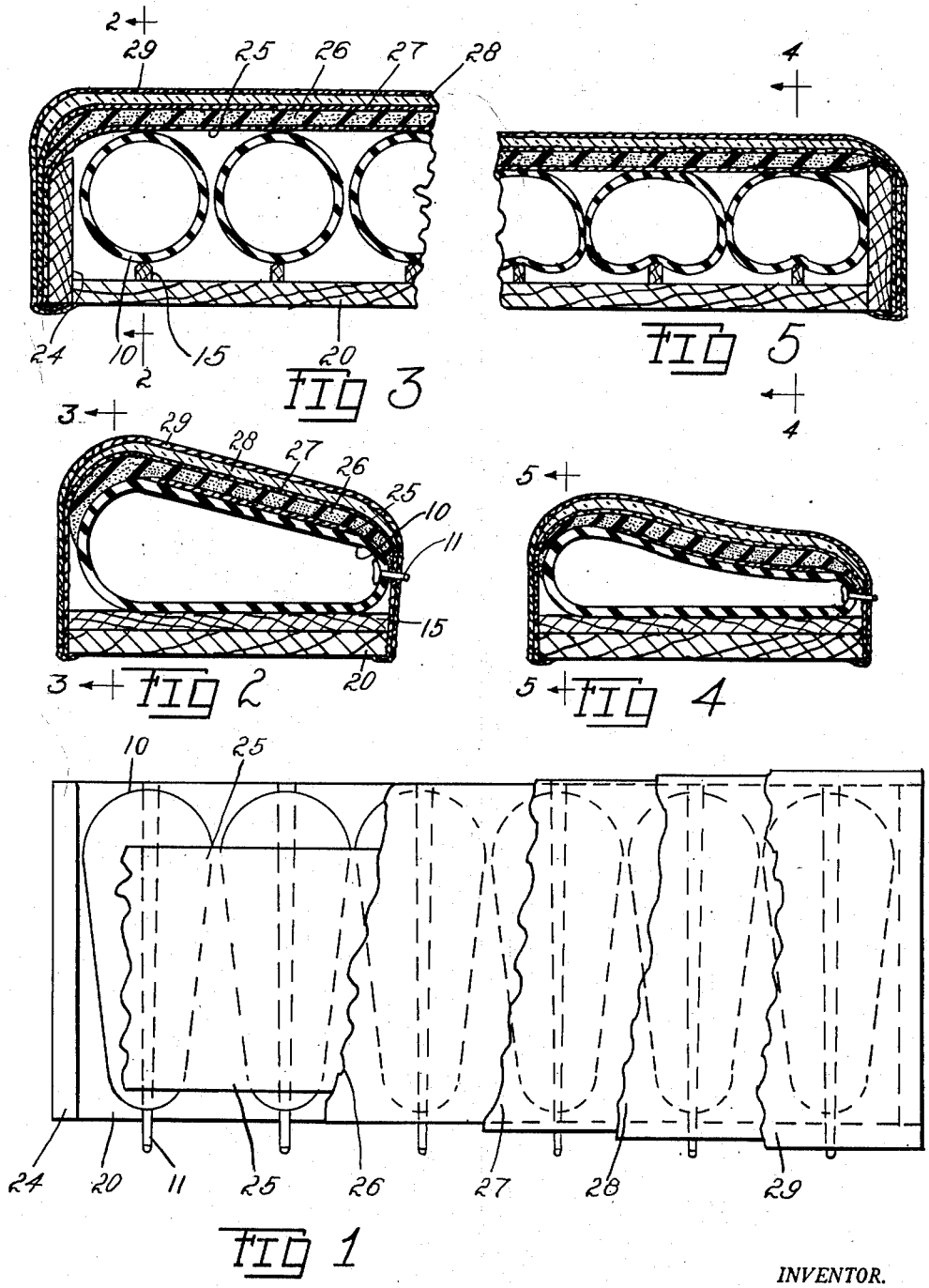

2,627,302

UNITED STATES PATENT OFFICE 2,627,302

PNEUMATIC SEAT CUSHION

Albert E. Forsyth, Britannia Bay, Ontario, Canada

Application September 16, 1948, Serial No. 49,472

3 Claims. (Cl. 155—179)

This invention relates to seat cushions and particularly to those that are used in automobiles, public carriers and the like.

Heretofore upholstered seat cushions have usually consisted of a frame, a padded cover and interposed metallic springs. Ordinarily the springs have been helical in form and have been securely fastened to the frame in a regular pattern with respect thereto.

An object of the present invention is to make a resilient seat which eliminates the necessity for the use of metallic springs and which is adequately suited for use in seats of various shapes and sizes and which is also capable of adjustment for any predetermined load.

In the drawings, Fig. 1 is a top plan view of a seat showing a portion thereof broken away to illustrate the interior construction; Fig. 2 is a section taken vertically and transversely through the seat on the line 2—2 in Fig. 3; Fig. 3 is a section of a part of the seat taken on the line 3—3 in Fig. 2; Fig. 4 is a section similar to Fig. 2 and taken on the line 4—4 in Fig. 5 and showing the position of the seat under load, and Fig. 5 is a section similar to Fig. 3 and taken on the plane 5—5 in Fig. 4 and showing the condition of the seat under load.

The seat embodying the present invention includes a plurality of resilient inflatable elements 10, each of which has a body which is preferably tapered and is provided with rounded ends. The elements are disposed in side by side arrangement with their axes substantially parallel and are positioned generally transversely of the longitudinal direction of the seat. Each element is provided at one end with an air valve 11, and has a wall thickness comparable to that of the inner tube of a passenger automobile tire. It is inflated to suit the convenience of the rider, but I have found that inflation to an amount less than one pound per square inch produces satisfactory riding quality.

Each pneumatic element is preferably supported upon a bar 15 which extends longitudinally of the element and the bars are in turn supported upon a base plate 20. In practice, each bar 15 preferably has the top thereof semi-circular in cross section, and if desired, each bar may be tapered, but preferably it is desired that the width of the bar at any point be about one-eighth of the diameter of the pneumatic element at such point.

The elements may be held in position adjacent their upper portions by a fabric strip 25 which is fastened to one end of the base and extends upwardly across the pneumatic elements and then is fastened to the opposite end of the base. The fabric, in practice, may be tacked to the underside of the base, or fastened in any suitable manner. If desired, a plate 24 may be fastened to the base at each end thereof.

Superimposed upon the strip of fabric 25 is a layer 26 of sponge rubber over which there is placed a liner 27 of fabric and then a layer 28 of felt, and then a layer 29 of upholstering material. The liner and upholstering material extend downwardly on all sides of the base and are fastened thereto and serve as a complete housing for the assembly. The liner and layer of upholstery material are apertured at the rear for the air valves to project slightly therethrough.

An advantage of the present invention is the fact that the riding qualities of a vehicle are greatly increased, because vibration is more readily absorbed before it reaches the occupant on the seat. A further advantage is that the seat may be constructed without the use of metallic springs.

I claim:

1. A seat cushion comprising, a rigid support, a plurality of rigid parallel spaced bars extending across and supported by said support, each of said bars being of a width substantally one-eighth of the center to center spacing thereof and having their upper surfaces substantially in a common plane, a plurality of elongated inflatable resilient elements, there being one such element mounted on top of each bar with its axis inclined and in substantial vertical alignment therewith, each of said elements tapering from one end to the other and having a maximum width substantially equal to said center to center spacing, means carried by said support and coacting with the endmost elements to restrict their movement away from the adjacent elements, a fabric retaining strip extending transversely across the top of said elements and having its ends secured to said support to retain said elements seated on their respective bars, and a layer of upholstery material supported by said strip and said elements.

2. A seat cushion comprising a rigid support, a plurality of parallel spaced rigid bars extending across and supported by said support, an individual inflatable, resilient, elongated element mounted on top of each bar with its axis inclined and in substantially vertical alignment with the respective bars, at least one portion of each of said elements having a width substantially equal to the spacing of said bars and positioned to contact with the corresponding portions of adjacent elements when under load, a rigid retaining member mounted on said support and engaging the outer side of each extreme element of said cushion, each of said bars comprising a relatively narrow upright strip having the upper edge portion thereof engaging one of said elements along the median line thereof, and having a height sufficient to permit the element when loaded to extend downwardly on each side thereof, a fabric strip extending transversely across the top of said elements, and having its ends secured to said members, and a layer of upholstery material supported by and substantially completing the enclosure of said elements.

3. A seat cushion comprising, a rigid support, a plurality of spaced parallel rigid bars extending across and supported by said support, said bars being of a width substantially one-eighth of the center to center spacing thereof and parallel with each other, an individual inflatable resilient element mounted on top of each bar and being substantially pear-shaped with its axis in substantial vertical alignment therewith, each of said elements having a maximum diameter substantially equal to the said spacing of said bars, and each of said bars having a height sufficient to permit the associated element when loaded to extend downwardly on each side thereof, said elements being transversely aligned with respect to each other, said support including means to restrict movement of the endmost elements away from the adjacent elements, a fabric confining strip extending transversely across the top of said elements and having its ends secured to said support, and a layer of upholstery material supported by said strips and elements, and secured to said support.

ALBERT E. FORSYTH.

REFERENCES CITED

The following references are of record in the file of this patent:

UNITED STATES PATENTS

| Number | Name | Date |
|---|---|---|
| 201,728 | White | Mar. 26, 1878 |
| 578,900 | Plew | Mar. 16, 1897 |
| 1,290,426 | Van Leuven | Jan. 7, 1919 |
| 1,456,207 | Adamski | May 22, 1923 |
| 1,711,255 | Weinman et al. | Apr. 30, 1929 |
| 1,928,675 | Sampson | Oct. 3, 1933 |
| 2,343,996 | Perry | Mar. 14, 1944 |
| 2,367,628 | Teague | Jan. 16, 1945 |
| 2,488,993 | Teague | Nov. 22, 1949 |

FOREIGN PATENTS

| Number | Country | Date |
|---|---|---|
| 191,459 | Great Britain | Jan. 11, 1923 |